(12) United States Patent
Kim et al.

(10) Patent No.: US 6,597,420 B2
(45) Date of Patent: Jul. 22, 2003

(54) LIQUID CRYSTAL DISPLAY DEVICE HAVING COLOR FILM ON A FIRST SUBSTRATE AND A METHOD FOR MANUFACTURING THE SAME

(75) Inventors: Woong Kwon Kim, Kyonggi-do (KR); Youn Gyoung Chang, Kyonggi-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/029,151

(22) Filed: Dec. 28, 2001

(65) Prior Publication Data

US 2002/0085149 A1 Jul. 4, 2002

(30) Foreign Application Priority Data

Dec. 30, 2000 (KR) .......................... 2000-86745

(51) Int. Cl.[7] ..................... G02F 1/1335; G02F 1/1333
(52) U.S. Cl. ........................... 349/106; 349/110
(58) Field of Search ................... 349/106, 110

(56) References Cited

U.S. PATENT DOCUMENTS 5,754,261 A * 5/1998 Lyu ........................ 349/44
5,757,452 A * 5/1998 Masaki et al. .............. 349/110
6,162,654 A * 12/2000 Kawabe ...................... 438/30

* cited by examiner

*Primary Examiner*—Julie Ngo
(74) *Attorney, Agent, or Firm*—Morgan, Lewis & Bockius LLP

(57) ABSTRACT

A liquid crystal display (LCD) device comprising first and second substrates facing to each other, a plurality of color filter films formed in each pixel region on the first substrate, a plurality of gate and data lines formed on the color filter films to cross one another to define pixel regions, a plurality of thin film transistors (TFTs) formed at crossing points of the plurality of gate and data lines, a plurality of pixel electrodes formed in the pixel regions of the first substrate, a plurality of island shaped first black matrix films formed on portions of the second substrate corresponding to the thin film transistors, and a common electrode formed on an entire surface of the second substrate including the first black matrix films.

25 Claims, 6 Drawing Sheets

LIQUID CRYSTAL DISPLAY DEVICE HAVING COLOR FILM ON A FIRST SUBSTRATE AND A METHOD FOR MANUFACTURING THE SAME

This application claims the benefit of the Korean Application No. P2000-086745 filed on Dec. 30, 2000, which is hereby incorporated by reference.

BACKGROUND OF THE INVENTION

1. Field of the Invention

The present invention relates to a display device, and more particularly, to a liquid crystal display (LCD) device and a method for manufacturing the same.

2. Discussion of the Related Art

With the advent of an information society of the 20th century, display devices obtaining low power consumption, high quality, miniaturization and portability have been required in various consumption patterns.

A TFT-LCD device, a flat panel display device including a plasma display panel (PDP) having a large size, can satisfy these requests, so that the TFT-LCD device has been attracted as a display device that can substitute for a related art CRT device.

Especially, the TFT-LCD device can obtain lightness in weight, high resolution, low power consumption, and portability. Furthermore, the TFT-LCD device does not generate electromagnetic waves having biological hazard, and can be used in the intelligent buildings of high technology all day.

However, the TFT-LCD device has problems such as high manufacturing cost, narrow viewing angle, low luminance and disadvantage for manufacturing large sized display device even though technology of the display device is considerably developed.

A related art LCD device will be described with reference to the accompanying drawings.

FIG. 1 is a plan view of the related art LCD device, and FIG. 2 is a sectional view showing a structure of the related art LCD device taken along line I–I' of FIG. 1.

In general, an LCD device includes a lower substrate, an upper substrate, and a liquid crystal layer. A thin film transistor (TFT) array region is formed in the lower substrate, a black matrix film and a color filter film are formed on the upper substrate, and the liquid crystal layer is formed between the lower and upper substrates.

As shown in FIG. 1 and FIG. 2, a plurality of gate lines 110 are formed on the lower substrate 101a at a constant distance, and a plurality of data lines 103 are formed in perpendicular to the plurality of gate lines to define pixel regions of matrix type. Then, a plurality of TFTs are formed at crossing points of the plurality of gate and data lines 110 and 103 in each pixel region, and a plurality of pixel electrodes 105 are formed in each pixel region.

At this time, the unit TFT includes a gate electrode and source/drain electrodes. The gate electrode of the TFT (not shown in FIG. 2) projects from the gate line 110 on the lower substrate 101a. Then, a gate insulating film 102 is formed on an entire surface of the lower substrate including the gate electrode and the gate line, and the data line 103 and the source/drain electrodes (not shown in FIG. 2) are formed on the gate insulating film 102. A passivation film 104 of a silicon nitride film is formed on the entire surface of the lower substrate including the data line 103 and the source/drain electrodes. At this time, the drain electrode is connected to the pixel electrode 105 through a contact hole formed in the passivation film 104 on the drain electrode.

A plurality of black matrix films 106 are patterned on the upper substrate 101b at a constant distance to prevent light from being incident on the plurality of data lines 103, the plurality of gate lines 110 and the TFTs on the lower substrate 101a. Then, R/G/B color filter films 107 are formed between the black matrix films 106 for displaying colors, and then an over coat film 108 is formed on the color filter films 107 to protect and planarize the color filter films 107. Then, a plurality of common electrodes 109 of ITO are formed on the over coat film 108.

The lower and upper substrates 101a and 101b are attached to each other with a constant distance, and liquid crystal is injected between the lower and upper substrates.

However, the related art LCD device and the method for manufacturing the same have the following problems.

The plurality of black matrix films are formed on portions of the upper substrate corresponding to the TFTs and the gate/data lines, and then the color filter films are formed on the black matrix films. At this time, to obtain low resistance on a transparent conductive film, contact areas between the transparent conductive film and the black matrix film are reduced. Accordingly, uniformity of common voltage on the upper substrate can be degraded.

SUMMARY OF THE INVENTION

Accordingly, the present invention is directed to an LCD device that substantially obviates one or more problems due to limitations and disadvantages of the related art.

An object of the present invention is to provide an LCD device and a method for manufacturing the same that can improve uniformity of common voltage by increasing contact areas between a black matrix film and a transparent conductive film.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an LCD device includes first and second substrates facing to each other, a plurality of color filter films formed in each pixel region on the first substrate, a plurality of gate and data lines formed on the color filter films to cross one another to define the pixel regions, a plurality of TFTs formed at crossing points of the plurality of gate and data lines, a plurality of pixel electrodes formed in the pixel regions on the first substrate, a plurality of island shaped first black matrix films formed on portions of the second substrate corresponding to the TFTs, and a plurality of common electrodes formed on an entire surface of the second substrate including the first black matrix films.

Preferably, a plurality of second black matrix films are formed between portions of the second substrate corresponding to the plurality of gate/data lines and the plurality of common electrodes.

Preferably, the plurality of second black matrix films are connected to the plurality of first black matrix films.

Preferably, the plurality of second black matrix films are narrower than the gate lines or the data lines.

Preferably, the pixel electrodes are overlapped with the gate lines or the data lines.

Preferably, a plurality of third black matrix films are formed between the color filter films below the TFTs and the first substrate, and a plurality of fourth black matrix films are formed between the color filter films below the gate/data lines and the first substrate.

Preferably, the plurality of third black matrix films prevent light of a backlight from being incident on active layers of the TFTs.

Preferably, the plurality of fourth black matrix films are wider than the gate lines or the data lines.

Preferably, the plurality of pixel electrodes are overlapped with the plurality of fourth black matrix films.

Preferably, a liquid crystal layer is formed between the first and second substrates.

In an LCD device according to the second embodiment of the present invention, the LCD device includes first and second substrate facing to each other, a plurality of color filter films in each pixel region on the first substrate, a plurality of gate and data lines formed on the color filter films to cross one another to define the pixel regions, a plurality of TFTs at crossing points of the plurality of gate and data lines, a plurality of pixel electrodes formed in each pixel region of the first substrate, a plurality of island shaped first black matrix films on portions of the second substrate corresponding to the TFTs, a plurality of second black matrix films on portions of the second substrate corresponding to the gate and data lines, and a plurality of common electrodes formed on an entire surface of the second substrate including the first and second black matrix films.

Preferably, the second black matrix films are formed on any one of the gate lines or the data lines.

In another aspect of the present invention, an LCD device includes the steps of forming a plurality of color filter films in each pixel region on a first substrate, forming an over coat film on the plurality of color filter films, forming a plurality of data and gate lines on the over coat film to cross one another, forming a plurality of TFTs at crossing points of the plurality of gate and data lines, forming a passivation film on the gate/data lines and the TFTs, forming pixel electrodes in the pixel regions on the passivation film, forming first black matrix films on portions of the second substrate corresponding to the TFTs, and forming common electrodes on the second substrate including the first black matrix films.

Preferably, a plurality of second black matrix films are formed between the common electrodes and portions of the second substrate corresponding to the gate lines or the data lines.

Preferably, the plurality of second black matrix films are narrower than the gate lines or the data lines.

Preferably, the plurality of pixel electrodes are overlapped with the gate lines or the data lines.

Preferably, a plurality of third black matrix films are formed between the color filter films below the TFTs and the first substrate, and a plurality of fourth black matrix films are formed between the color filter films below the gate/data lines and the first substrate.

Preferably, the plurality of pixel electrodes are overlapped with the plurality of fourth black matrix films.

Preferably, a liquid crystal is injected between the first and second substrates.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENT

Reference will now be made in detail to the preferred embodiments of the present invention, examples of which are illustrated in the accompanying drawings.

Figure 1:
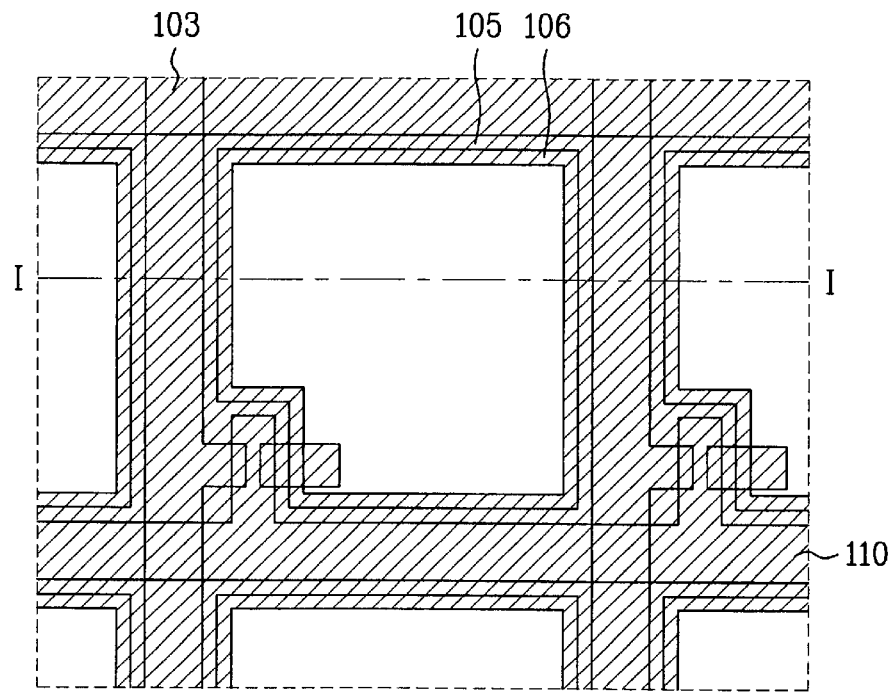
FIG. 1 is a plan view of a related art LCD device.
Figure 2:
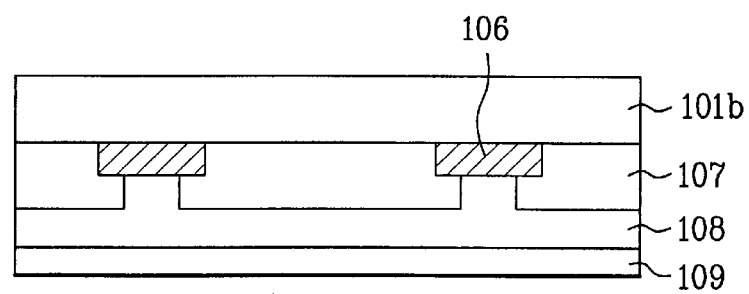
FIG. 2 is a sectional view showing a structure of a related art LCD device taken along line I–I' of FIG. 1.
Figure 2:
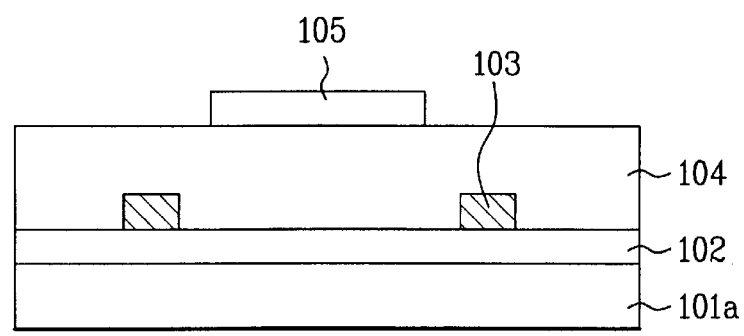
Figure 3:
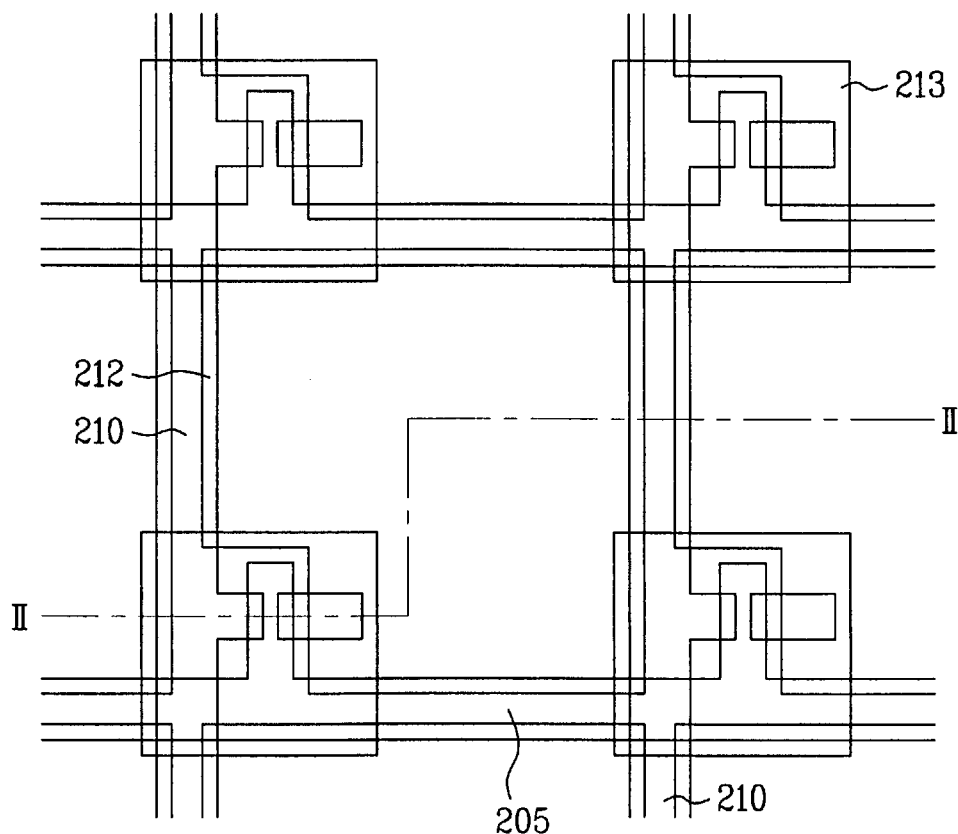
FIG. 3 is a plan view of an LCD device according to the first embodiment of the present invention.
Figure 4:
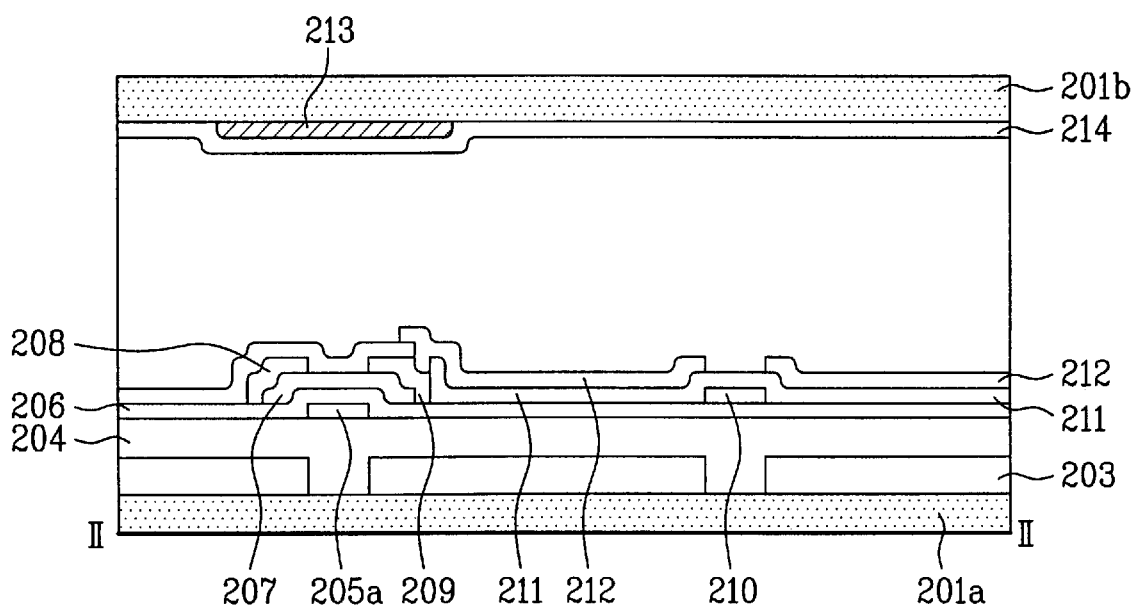
FIG. 4 is a sectional view showing a structure of an LCD device taken along line II–II' of FIG. 3.

FIG. 3 is a plan view showing a structure of an LCD device according to the first embodiment of the present invention. FIG. 4 is a sectional view showing a structure of the LCD device taken along line II–II' of FIG. 3.

In the LCD device according to the first embodiment of the present invention, to maximize contact areas between common electrodes and black matrix films, a plurality of color filter films are formed on a lower substrate (first substrate, insulating substrate), and the island shaped black matrix films are formed on portions of an upper substrate (second substrate, insulating substrate) corresponding to TFT regions.

As shown in FIG. 3 and FIG. 4, R/G/B color filter films for displaying colors are formed in each pixel region on the lower substrate 201a, and then an over coat film 204 is formed on an entire surface of the lower substrate including the color filter films 203. A plurality of gate lines 205 having a plurality of gate electrodes 205a at a constant distance are formed on the over coat film 204. Then, a gate insulating film 206 is formed on the entire surface of the lower substrate including the plurality of gate electrodes 205a and the gate lines 205.

Subsequently, a plurality of semiconductor films 207 served as channel films of the TFTs are formed on the gate insulating film 206 above the gate electrodes 205a, and a plurality of data lines 210 are formed in perpendicular to the plurality of gate lines 205 to form a plurality of source and drain electrodes 208 and 209 at both sides of the semiconductor films 207.

A passivation film 211 is formed on the entire surface of the lower substrate including the data lines 210 and the source/drain electrodes 208 and 209 to form contact holes in the drain electrodes 209. Then, a plurality of pixel electrodes 212, which are electrically connected with the drain electrodes 209 through the contact holes, are formed on the passivation film 211 of each pixel region. At this time, the pixel electrodes 212 are overlapped with the adjacent gate and data lines 205 and 210.

Then, the island shaped black matrix films 213 are formed to prevent photocurrent from generating on portions of the upper substrate 201b corresponding to the TFTs due to external light incident on the semiconductor films of the TFTs, and the common electrodes 214 of ITO are formed on the entire surface of the upper substrate including the black matrix films 213.

In the LCD device according to the first embodiment of the present invention, the black matrix films 213 of the upper substrate prevent external light from being incident on the semiconductor films of the TFTs. Also, the gate electrodes 205a prevent light of a backlight from being incident on the semiconductor films of the TFTs. The pixel electrodes 212 are overlapped with the adjacent gate and data lines 205 and 210 to prevent light from leaking between the pixel electrodes 212 and the gate lines or the data lines 205 or 210.

Figure 5:
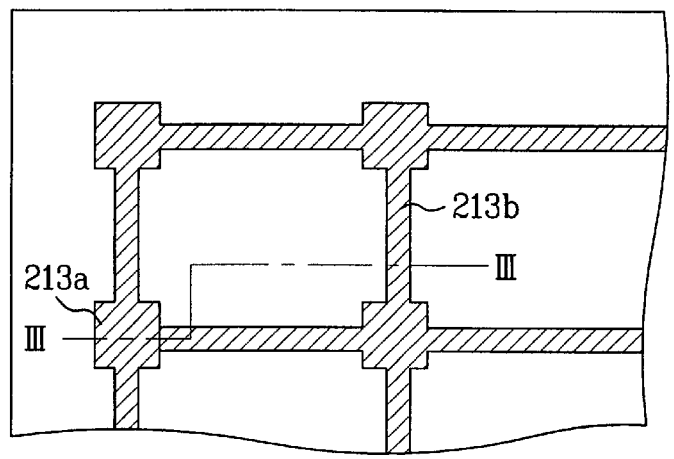
FIG. 5 is a plan view of a black matrix film of an upper substrate in an LCD device according to the second embodiment of the present invention.
Figure 6:
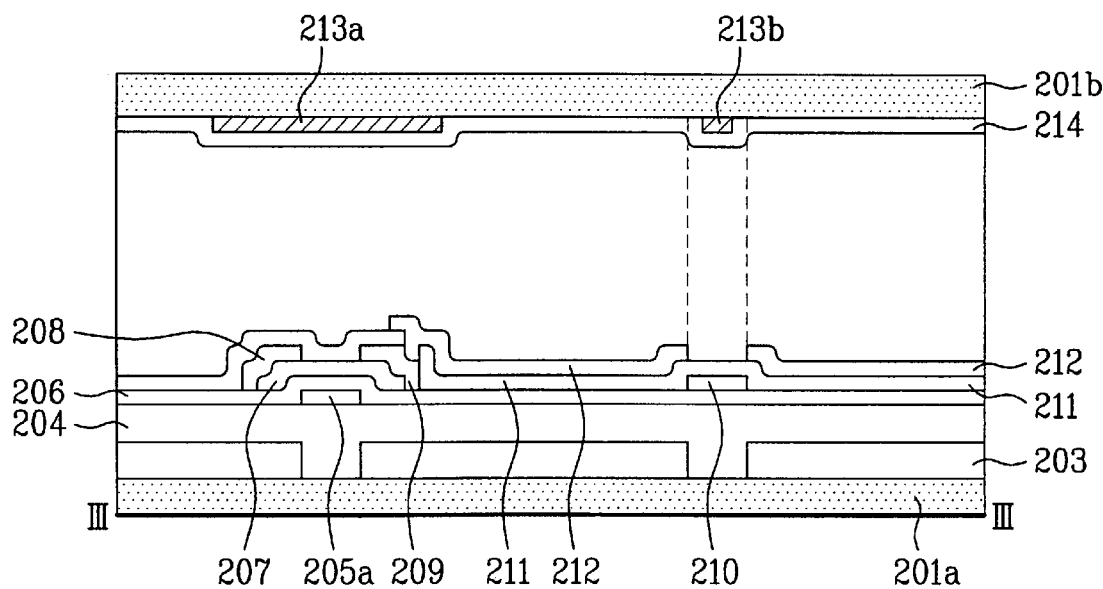
FIG. 6 is a sectional view showing a structure of an LCD device taken along line III–III' of FIG. 5.

FIG. 5 is a plan view of a black matrix film of an upper substrate in an LCD device according to the second embodiment of the present invention. FIG. 6 is a sectional view of an LCD device taken along line III–III' of FIG. 5.

In the LCD device according to the second embodiment of the present invention, a plurality of black matrix films are formed on portions of the upper substrate corresponding to TFT regions and gate/data lines. At this time, the black matrix films are narrower than the gate and data lines.

As shown in FIG. 5 and FIG. 6, a plurality of first black matrix films 213a are formed on portions of the upper substrate 201b corresponding to the TFTs, and a plurality of second black matrix films 213b are formed on portions of the upper substrate 201b corresponding to the gate and data lines 205 and 210. At this time, the second black matrix films 213b are narrower than the gate and data lines 205 and 210.

Figure 7:
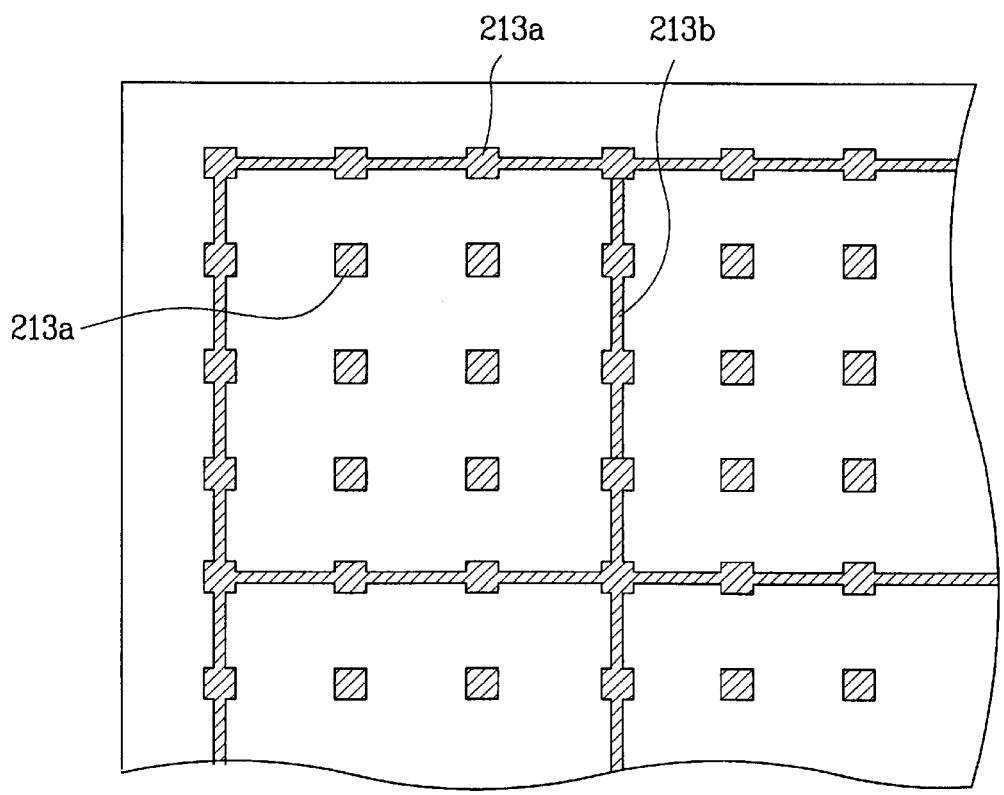
FIG. 7 is a plan view of a black matrix film of an upper substrate in an LCD device according to the third embodiment of the present invention.

FIG. 7 is a plan view of an LCD device according to the third embodiment of the present invention.

In the LCD device according to the third embodiment of the present invention, a plurality of black matrix films are formed on portions of an upper substrate corresponding to TFT regions and gate/data lines of a lower substrate like the LCD device according to the second embodiment of the present invention. Meanwhile, the number of second black matrix films 213b formed on portions of the upper substrate corresponding to the gate lines or the data lines varies. That is, all first black matrix films 213a are not connected by the second black matrix films 213b. Some of the island shaped first black matrix films 213a are connected by the second black matrix films 213b formed on portions of the upper substrate corresponding to the gate lines or the data lines.

Figure 8:
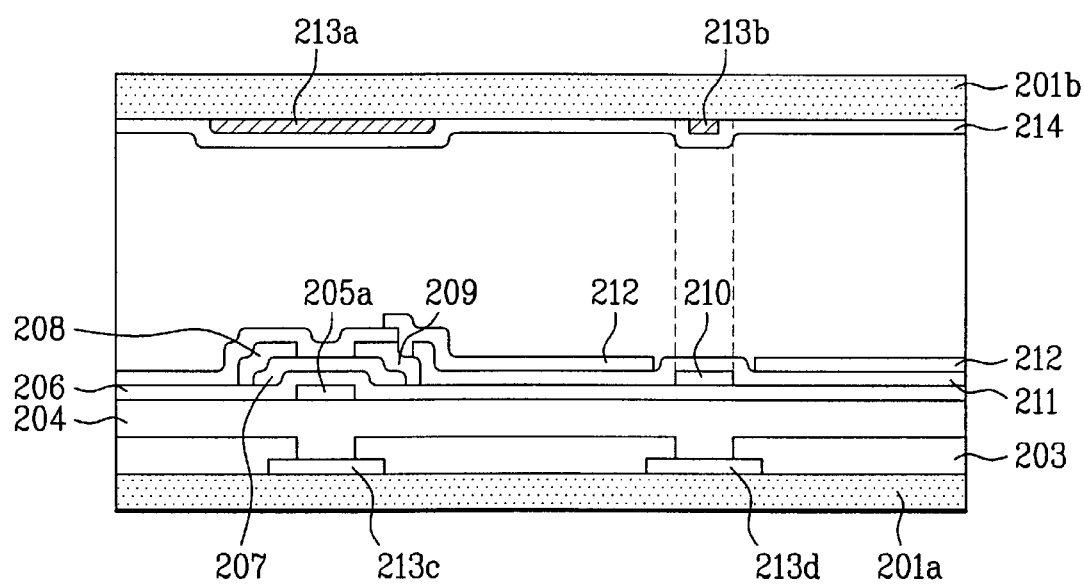
FIG. 8 is a sectional view showing a structure of an LCD device according to the fourth embodiment of the present invention.

FIG. 8 is a sectional view showing a structure of an LCD device according to the fourth embodiment of the present invention.

In the LCD device according to the fourth embodiment of the present invention, a plurality of black matrix films are formed on portions of an upper substrate like the LCD devices according to the first, second, and third embodiments of the present invention, and then the plurality of black matrix films are additionally formed on a lower substrate.

As shown in FIG. 8, a plurality of third and fourth black matrix films 213c and 213d are formed on portions of the lower substrate 201a corresponding to TFTs and gate/data lines, and then R/G/B color filter films 203 are formed for displaying colors in each pixel region. An over coat film 204 is formed on an entire surface of the lower substrate inclusive of the plurality of color filter films 203. Then, a plurality of gate lines 205 having a plurality of gate electrodes 205a at a constant distance are formed on the over coat film 204, and a gate insulating film 206 is formed on the entire surface of the lower substrate including the gate electrodes 205a and the gate lines 205.

A plurality of semiconductor films 207 served as channel films of the TFTs are formed on the gate insulating film 206 above the gate electrodes 205a, and a plurality of data lines 210 are formed in perpendicular to the plurality of gate lines 205 to form a plurality of source and drain electrodes 208 and 209 at both sides of the semiconductor films 207.

A passivation film 211 is formed on the entire surface of the substrate including the plurality of data lines 210 and source/drain electrodes 208 and 209 to form contact holes in the plurality of drain electrodes 209. A plurality of pixel electrodes 212, which are electrically connected with the drain electrodes 209 through the contact holes, are formed on the passivation film 211 of each pixel region. At this time, the pixel electrodes 212 are not overlapped with the adjacent gate and data lines 205 and 210, however, the pixel electrodes 212 are overlapped with fourth black matrix films 213d.

Then, first black matrix films 213a island shaped are formed to prevent photocurrent from generating on portions of the upper substrate 201b corresponding to the TFT regions due to external light incident on the semiconductor films of the TFTs, and second black matrix films 213b are formed on portions of the upper substrate 201b corresponding to gate and data lines 205 and 210. Then, common electrodes 214 of ITO are formed on the entire surface of the upper substrate 201b including the plurality of first and second black matrix films 213a and 213b.

In the LCD device according to the fourth embodiment of the present invention, the first black matrix films 213 of the upper substrate prevent external light from being incident on the semiconductor films of the TFTs. Also, the third black matrix films 213c prevent light of a backlight from being incident on the semiconductor films of the TFTs. The fourth black matrix films 213d prevent light from leaking between the pixel electrodes 212 and the gate/data lines 205 and 210, which are wider than the gate lines or the data lines.

A method for manufacturing above LCD device according the present invention will be described in detail.

FIG. 9a to FIG. 9d are sectional views showing manufacturing process steps of the lower substrate in the LCD device according to the present invention. FIG. 10a and FIG. 10b are sectional views showing manufacturing process steps of the upper substrate in the LCD device according to the present invention.

First, a method for manufacturing the lower substrate will be described as follows.

Figure 9A:
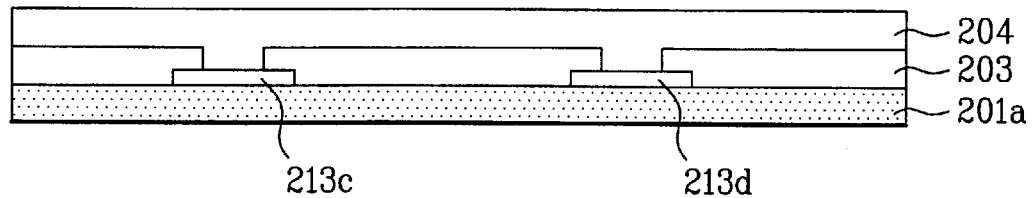
FIG. 9a to FIG. 9d are sectional views showing manufacturing process steps of a lower substrate in an LCD device according to the present invention.
Figure 10A:
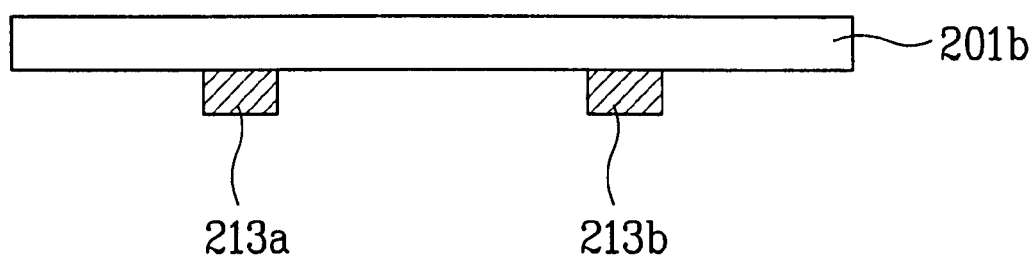
FIG. 10a and FIG. 10b are sectional views showing manufacturing process steps of an upper substrate in an LCD device according to the present invention.
Figure 10B:
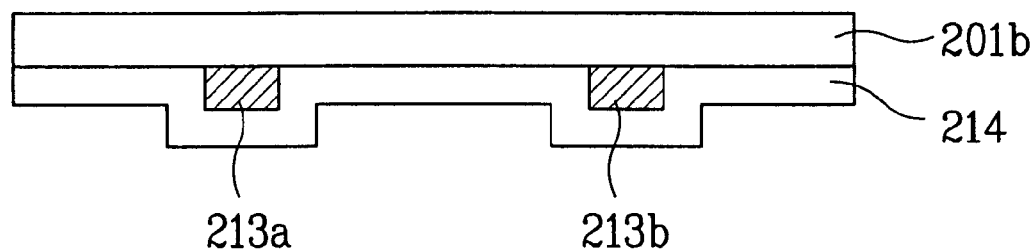

As shown in FIG. 9a, the plurality of third and fourth black matrix films 213c and 213d are formed of black resin material on the lower substrate 201a divided into the TFT and data line regions. Then, the R/G/B color filter films are formed between the third and fourth black matrix films for displaying colors. Subsequently, the over coat film 204 is formed on the entire surface of the lower substrate including the color filter films 203 to protect the color filter films 203 and to form the TFTs.

At this time, the over coat film 204 is formed of material that can be harden by cure after spin coating such as BCB, HSQ, SSQ, MSSQ, POSS and $FO_x$.

Figure 9B:
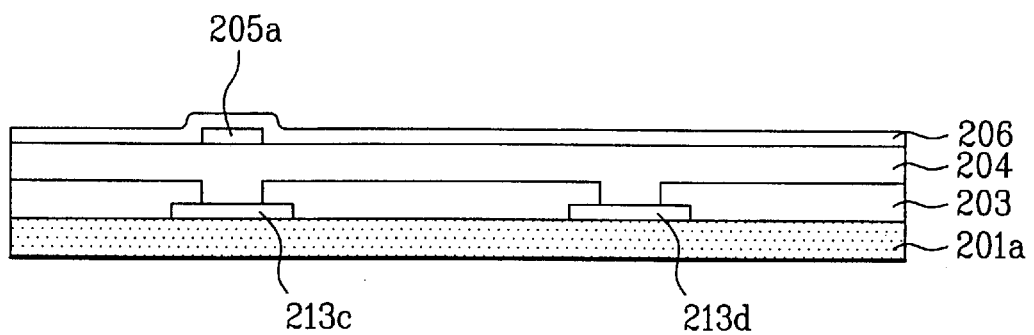

As shown in FIG. 9b, gate lines (not shown) having gate electrodes 205a are formed on the over coat film 204 at a constant distance, and then a gate insulating film 206 is formed on the entire surface of the substrate including the gate electrodes 205a.

Figure 9C:
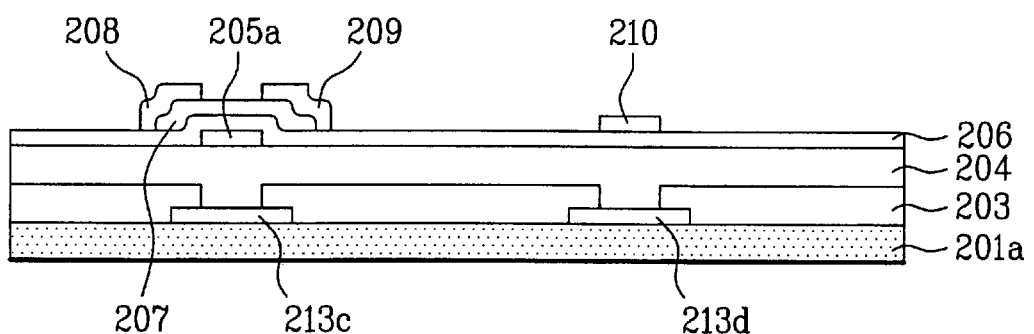

As shown in FIG. 9c, the plurality of semiconductor films 207 are formed in the TFT regions (above the gate electrode) on the gate insulating film 206, and then a plurality of data lines 210 are formed in perpendicular to the gate lines 205 to form source and drain electrodes 208 and 209 at both sides of the semiconductor films 207.

Figure 9D:
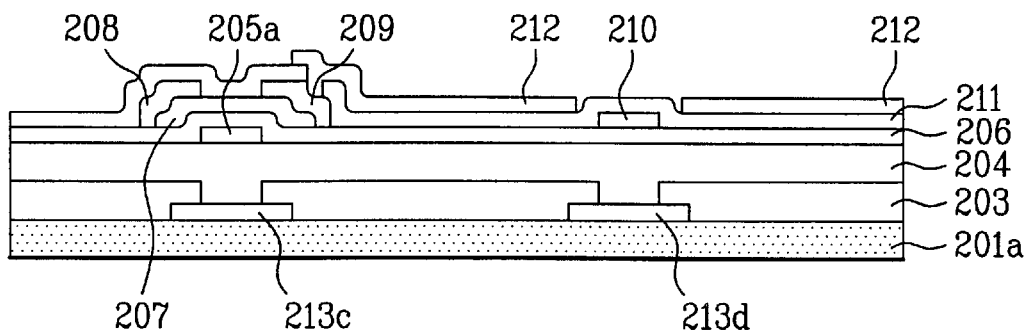

As shown in FIG. 9d, a passivation film 211 is formed on the entire surface including the source/drain electrodes 208 and 209 and data lines 210. Then, a plurality of contact holes are formed by selectively removing the passivation film 211 on the drain electrodes 209. A transparent conductive film of ITO is deposited by sputtering and is patterned in each pixel region, which is partially overlapped with the fourth black matrix films 213d, thereby forming the pixel electrodes 212. Therefore, manufacturing process steps for forming the lower substrate are completed.

As shown in FIG. 10a, black matrix material is deposited and patterned on the upper substrate 201b, so that first and second black matrix films 213a and 213b are formed on portions of the upper substrate corresponding to the TFTs, and gate/data lines. At this time, the second black matrix films 213b are narrower than the gate and data lines.

As shown in FIG. 10b, transparent conductive film of ITO is formed on the entire surface of the upper substrate 201b including the first and second black matrix films 213a and 213b by sputtering, thereby forming the common electrodes 214.

Although not shown, the lower and upper substrates 201a and 201b are attached to each other, and then the liquid crystal is injected between the lower and upper substrates.

FIG. 9a to FIG. 9d and FIG. 10a to FIG. 10b illustrates manufacturing process steps of the LCD device according to the fourth embodiment of the present invention. However, in manufacturing process steps of the LCD device according to the first, second and third embodiments of the present invention, forming process step of the second black matrix film or the third and fourth black matrix films of the lower substrate can be reduced, or the pixel electrodes are overlapped with the adjacent data and gate lines during forming the pixel electrodes.

As mentioned above, the LCD device and the method for manufacturing the same have the following advantages.

That is, the plurality of color filter films are formed on the lower substrate, and the plurality of black matrix films island shaped are formed on portions of the upper substrate corresponding to the TFTs to prevent light from leaking. Then, the black matrix films island shaped are connected to one another by thin black matrix films of matrix type, so that resistance of the transparent conductive film formed on the black matrix films can be reduced, thereby improving uniformity of the common voltage.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A liquid crystal display (LCD) device comprising:
   first and second substrates facing to each other;
   a plurality of color filter films formed in each pixel region on the first substrate;
   a plurality of gate and data lines formed on the color filter films to cross one another to define pixel regions;
   a plurality of thin film transistors (TFTs) formed at crossing points of the plurality of gate and data lines;
   a plurality of pixel electrodes formed in the pixel regions of the first substrate;
   a plurality of island shaped first black matrix films formed on portions of the second substrate corresponding to the thin film transistors; and
   a common electrode formed on an entire surface of the second substrate including the first black matrix films.

2. The LCD device as claimed in claim 1, further comprising a plurality of second black matrix films formed between portions of the second substrate corresponding to the plurality of gate/data lines and the common electrode.

3. The LCD device as claimed in claim 2, wherein the plurality of second black matrix films are connected to the plurality of first black matrix films.

4. The LCD device as claimed in claim 2, wherein the plurality of second black matrix films are narrower than the gate lines or the data lines.

5. The LCD device as claimed in claim 1, further comprising an over coat film between the color filter films and the TFTs.

6. The LCD device as claimed in claim 1, wherein the pixel electrodes are overlapped with the adjacent gate and data lines.

7. The LCD device as claimed in claim 2, further comprising;
   a plurality of third black matrix films formed on the first substrate and between the color filter films below the thin film transistors; and
   a plurality of fourth black matrix films formed on the first substrate and between the color filter films below the gate/data lines.

8. The LCD device as claimed in claim 7, wherein the third black matrix films prevent light of a backlight from being incident on active layers of the TFTs.

9. The LCD device as claimed in claim 7, wherein the fourth black matrix films are wider than the gate lines or the data lines.

10. The LCD device as claimed in claim 7, wherein the pixel electrodes are overlapped with the fourth black matrix films.

11. The LCD device as claimed in 1, further comprising a liquid crystal layer between the first and second substrates.

12. A liquid crystal display (LCD) device comprising:
   first and second substrate facing to each other;
   a plurality of color filter films in each pixel region on the first substrate;
   a plurality of gate and data lines formed on the color filter films to cross one another to define pixel regions;
   a plurality of thin film transistors (TFTs) at crossing points of the plurality of gate and data lines;
   a plurality of pixel electrodes formed in each pixel region on the first substrate;

a plurality of island shaped first black matrix films on portions of the second substrate corresponding to the thin film transistors;

a plurality of second black matrix films on portions of the second substrate corresponding to the gate and data lines; and a common electrode formed on an entire surface of the second substrate covering the first and second black matrix films.

13. The LCD device as claimed in claim 12, wherein some of the first black matrix films are connected to the second black matrix films.

14. The LCD device as claimed in claim 13, wherein the second black matrix films are formed on the gate lines or the data lines.

15. The LCD device as claimed in claim 14, wherein the second black matrix films are narrower than the gate lines or the data lines.

16. The LCD device as claimed in claim 12, wherein the pixel electrodes are overlapped with the gate lines or the data lines.

17. The LCD device as claimed in claim 12, further comprising;

a plurality of third black matrix films formed on the first substrate and between the color filter films below the thin film transistors, and a plurality of fourth black matrix films formed on the first substrate and between the color filter films below the gate/data lines.

18. The LCD device as claimed in claim 17, wherein the pixel electrodes are overlapped with the fourth black matrix films.

19. A method for manufacturing a liquid crystal display (LCD) device comprising the steps of:

forming a plurality of color filter films in each pixel region on a first substrate;

forming an over coat film on the plurality of color filter films;

forming a plurality of data and gate lines on the over coat film to cross one another for forming pixel regions;

forming a plurality of thin film transistors (TETs) at crossing points of the plurality of gate and data lines on the over coat film;

forming a passivation film on the gate/data lines and the thin film transistors;

forming pixel electrodes in the pixel regions on the passivation film;

forming first black matrix films on portions of the second substrate corresponding to the thin film transistors; and forming a common electrode on the second substrate covering the first black matrix films.

20. The method as claimed in claim 19, further comprising the step of forming a plurality of second black matrix films between the common electrode and portions of the second substrate corresponding to the gate lines or the data lines.

21. The method as claimed in claim 20, wherein the second black matrix films are narrower than the gate lines or data lines.

22. The method as claimed in claim 20, wherein the plurality of pixel electrodes are overlapped with the gate lines or the data lines.

23. The method as claimed in claim 19, further comprising the steps of;

forming a plurality of third black matrix films on the first substrate and between the color filter films below the thin film transistors, and forming a plurality of fourth black matrix films on the first substrate and between the color filter films below the gate/data lines.

24. The method as claimed in claim 23, wherein the plurality of pixel electrodes are overlapped with the plurality of fourth black matrix films.

25. The method as claimed in claim 19, further comprising the step of injecting a liquid crystal between the first and second substrates.

* * * * *